US008908613B2

(12) United States Patent
Richardson et al.

(10) Patent No.: US 8,908,613 B2
(45) Date of Patent: Dec. 9, 2014

(54) PROGRESSIVE INFORMATION BEACON SYMBOLS

(75) Inventors: Thomas Richardson, South Orange, NJ (US); Junyi Li, Chester, NJ (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1004 days.

(21) Appl. No.: 12/446,559

(22) PCT Filed: Oct. 23, 2007

(86) PCT No.: PCT/US2007/082216
§ 371 (c)(1),
(2), (4) Date: Apr. 21, 2009

(87) PCT Pub. No.: WO2008/051965
PCT Pub. Date: May 2, 2008

(65) Prior Publication Data
US 2010/0309853 A1 Dec. 9, 2010

Related U.S. Application Data

(60) Provisional application No. 60/863,119, filed on Oct. 26, 2006.

(51) Int. Cl.
*H04W 4/00* (2009.01)
*H04L 27/26* (2006.01)
*H04W 48/12* (2009.01)
*H04L 5/02* (2006.01)

(52) U.S. Cl.
CPC .......... *H04L 27/261* (2013.01); *H04L 27/2608* (2013.01); *H04W 48/12* (2013.01); *H04L 5/023* (2013.01)
USPC ........................................ 370/329

(58) Field of Classification Search
CPC ..................................... H04L 27/261
USPC ............................................ 370/329
See application file for complete search history.

(56) References Cited

U.S. PATENT DOCUMENTS

| 5,835,529 A | 11/1998 | Koga et al. |
| 7,224,741 B1 * | 5/2007 | Hadad ........................ 375/260 |
| 2005/0085214 A1 * | 4/2005 | Laroia et al. ................ 455/403 |

FOREIGN PATENT DOCUMENTS

| CN | 1685647 A | 10/2005 |
| JP | H05276211 | 10/1993 |

(Continued)

OTHER PUBLICATIONS

International Search Report, PCT/US2007/082216, International Search Authority—European Patent Office, Aug. 4, 2008.

(Continued)

*Primary Examiner* — Mark Rinehart
*Assistant Examiner* — Maharishi Khirodhar
(74) *Attorney, Agent, or Firm* — Stanton Braden

(57) ABSTRACT

Systems and methodologies are described that facilitate transmitting beacon symbols comprising static and dynamic information about the beacon and/or a transmitter thereof (or substantially any information a beacon transmitter desires to send). In this regard, the beacon symbol transmitter can select a subcarrier of bandwidth for transmitting the beacon symbol where the subcarrier is indicative of data and is in one of a plurality of subcarrier groups related to the total available subcarriers. Thus, the groups can have common virtual subcarriers such that a subcarrier index can be found in each group. In this way, the selected group can indicate additional information that can change based on what group is selected for transmitting a given beacon symbol.

44 Claims, 11 Drawing Sheets

(56) References Cited

FOREIGN PATENT DOCUMENTS

| JP | 10079690 A | 3/1998 |
| JP | 2001148678 A | 5/2001 |
| WO | WO 2004019529 A2 * | 3/2004 |
| WO | 2004019529 | 4/2004 |
| WO | 2005109657 | 11/2005 |
| WO | 2005109917 | 11/2005 |

OTHER PUBLICATIONS

International Preliminary Report on Patentability—PCT/US07/082216, The International Bureau of WIPO, Geneva Switzerland—Apr. 28, 2009.

Written Opinion—PCT/US07/082216, International Search Authority—European Patent Office—Aug. 4, 2008.

Taiwan Search Report—TW096140454—TIPO—Aug. 17, 2011.

* cited by examiner

PROGRESSIVE INFORMATION BEACON SYMBOLS

CROSS-REFERENCE TO RELATED APPLICATIONS

This application claims the benefit of U.S. Provisional Patent application Ser. No. 60/863,119 entitled "METHOD AND APPARATUS FOR SENDING INFORMATION IN BEACONS IN A WIRELESS COMMUNICATION SYSTEM" which was filed Oct. 26, 2006. The entirety of the aforementioned application is herein incorporated by reference.

BACKGROUND

I. Field

The following description relates generally to wireless communications, and more particularly to creating and transmitting beacon symbols in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. The antennae can relate to both base stations (e.g. access points) and mobile devices (e.g. access terminals) in one example, where the base station can provide communication channels to the mobile devices. Base stations can transmit beacon signals for interpretation by the mobile devices in an attempt to identify the base station and/or a transmission carrier or sector thereof. The signal can relate to a beacon message that can be transmitted as a repetitive static sequence of beacon symbols to send the identification information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating sending static and dynamic data in beacon symbols. In particular, the bandwidth can be divided into a number of groups of subcarriers; a subcarrier in a group is chosen for transmitting the beacon. The subcarrier index within the group and the group itself can both be indicative of data.

According to related aspects, a method of transmitting a first and a second sets of information data via a beacon symbol using a symbol including a plurality of subcarriers is described herein. The method can comprise partitioning the plurality of subcarriers into a plurality of groups of subcarriers, each group including a number of subcarriers. The method can also comprise selecting one group of subcarriers from the plurality of groups of subcarriers as a function of the first set of information data and selecting a subcarrier index within the selected group for transmitting a beacon symbol as a function of the second set of information data. Furthermore, the method can comprise transmitting the beacon symbol on the selected subcarrier index of the selected group.

Another aspect relates to a wireless communications apparatus. The wireless communications apparatus can include at least one processor configured to select a subcarrier index, for transmitting static beacon data, and a group of subcarriers comprising a corresponding index, the group selection indicates dynamic beacon data. The wireless communications apparatus can also include a memory coupled to the at least one processor.

Yet another aspect relates to a wireless communications apparatus for transmitting static and dynamic data in a beacon code. The wireless communications apparatus can include means for selecting a group of subcarriers for transmitting a beacon symbol and means for selecting a subcarrier index within the group of subcarriers for transmitting the beacon symbol. Additionally, the wireless communications apparatus can comprise means for transmitting the beacon symbol on the selected subcarrier index of the selected group, the subcarrier index and the group respectively indicating first and second information.

Still another aspect relates to a computer program product, which can have a computer-readable medium including code for causing at least one computer to partition the plurality of subcarriers into a plurality of groups of subcarriers, each group including a number of subcarriers. The code can also cause the at least one computer to select one group of subcarriers from the plurality of groups of subcarriers as a function of the first set of information data. Moreover, the code can cause the at least one computer to select a subcarrier index within the selected group for transmitting a beacon symbol as a function of the second set of information data.

In accordance with another aspect, an apparatus in a wireless communication system can include a processor configured to select a group of subcarriers for transmitting a beacon symbol and select a subcarrier index within the group of subcarriers for transmitting the beacon symbol. The processor can also be configured to transmit the beacon symbol on the selected subcarrier index of the selected group, the subcarrier index and the group respectively indicating first and second information. Also, the apparatus can include a memory coupled to the processor.

According to a further aspect, a method for decoding beacon symbols including static and dynamic information is described herein. The method can comprise receiving a beacon symbol and determining a group of subcarriers used to transmit the beacon symbol, wherein the group is part of a plurality of groups over a total number of available subcarriers. Moreover, the method can comprise determining a subcarrier within the group of subcarriers used to transmit the beacon symbol.

Another aspect relates to a wireless communications apparatus. The wireless communications apparatus can include at least one processor configured to determine a subcarrier used for transmitting a beacon symbol and determine a group of subcarriers to which the subcarrier belongs. The wireless communications apparatus can also include a memory coupled to the at least one processor.

Yet another aspect relates to a wireless communication apparatus for decoding multiple information types of a beacon symbol. The apparatus can comprise means for determining a subcarrier used for a beacon symbol and means for determining a group of subcarriers used for the beacon symbol. The wireless communications apparatus can also include means for recovering first information based on the subcarrier and means for recovering second information based on the group of subcarriers.

Still another aspect relates to a computer program product, which can have a computer-readable medium including code for causing at least one computer to receive a beacon symbol and code for causing the at least one computer to determine a group of subcarriers used to transmit the beacon symbol, wherein the group is part of a plurality of groups over a total number of available subcarriers. The code can also cause the at least one computer to determine a subcarrier within the group of subcarriers used to transmit the beacon symbol.

In accordance with another aspect, an apparatus can be provided in a wireless communication system including a processor configured to determine a subcarrier used for a beacon symbol, determine a group of subcarriers used for the beacon symbol, recover first information based on the subcarrier, and recover second information based on the group of subcarriers. Additionally, the apparatus can comprise a memory coupled to the processor To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
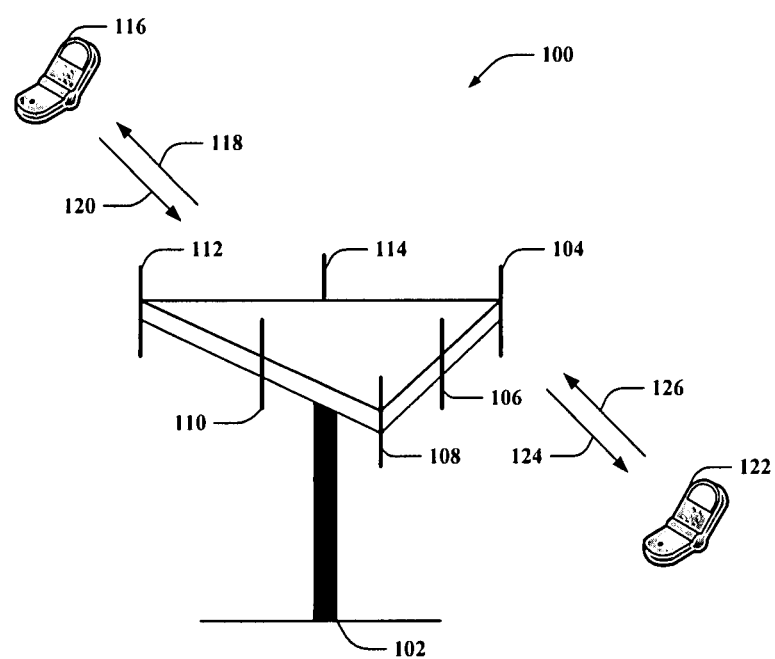
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In one example, the base station 102 can send a beacon symbol from each antenna 104, 106, 108, 110, 112, and 114, and/or a grouping of antennae comprising information regarding the antenna and/or corresponding base station 102, such as identification information and/or other metrics or general information associated with the antennae and/or base station 102. According to an example, a beacon symbol can be a portion of a signal that is transmitted with substantial power to signal a small message to one or more mobile devices 116 and 122 that can have very low signal to noise ratios (due to distance or other interference, for example). The mobile devices 116 and 122 can receive one or more beacon symbols to discern information related to the antennae and/or base station 102; in one example, the beacon symbol can be one of the first signals the mobile devices 116 and 122 can interpret regarding a base station 102 or antenna. To this end, a beacon symbol can be sent so that it is easily identifiable by the mobile devices 116 and 122. According to an example, the base station 102 can send a beacon symbol from a given antenna 104, 106, 108, 110, 112, and/or 114 by transmitting substantially all available power on a single subcarrier channel thereof (or a small number of channels). The mobile devices 116 and/or 122 can receive the signal and perform a fast Fourier transform (FFT), or other decoding algorithm, on the signal to determine that one channel has a very high frequency as compared to the others. The mobile devices 116 and/or 122 can discern that this is a beacon symbol related to a given antenna and/or base station 102 and interpret the symbol accordingly.

In one example, the base station 102 or other transmitter of a beacon and/or a symbol thereof can desire to send static and dynamic information (e.g., the static and dynamic information can be unrelated and/or cause different actions within or among one or more devices in one example). For example, the beacon can be sent with identifying information, but additional dynamic data can be sent with the same such that mobile devices 116 and 122 can receive and decode the beacon symbol to identify the sector and/or obtain other dynamic information. To achieve this functionality, the bandwidth of a carrier can be separated into a number of subcarriers; the subcarriers can be grouped into a plurality of sets according to size of the desired dynamic information. For example, if the desired dynamic information comprises sending a 0 or 1, the subcarriers can be grouped into 2 groups. The groups can be evenly divided, in one example, such that the static beacon can be sent on a subcarrier indexed within either group; the group chosen depends on the information desired, and each group can comprise the desired subcarrier index.

For example, where the number of subcarriers=256, in this example, they can be divided into two groups of 128, and the beacon symbol can assign to a subcarrier numbered 0-127. Where the base station 102 wishes to send dynamic data of '0' with the beacon, a group of subcarriers can be chosen, and where '1' is desired, the other group can be chosen. For example, if the subcarrier index for the beacon symbol is 31, where the base station 102 desires to send '0' with the beacon symbol, it can send the beacon out on subcarrier index 31 of group 0 (which can actually be physical subcarrier 31). Where the base station 102 desires to send '1' with the beacon, the beacon symbol can be transmit on subcarrier index 31 of group 1 (which can be physical subcarrier 31+128=159). It is to be appreciated that the groups can be switched such that '0' matches the second group.

In this example as well, system 100 can be a multiple-input multiple-output (MIMO) communication system. Further, system 100 can utilize any type of duplexing technique to divide communication channels (e.g., forward link, reverse link, . . . ) such as FDD, TDD, and the like. In one example, the system 100 can be an OFDMA system where symbols can be transmitted over a given frequency for a time period. The mobile devices 116 and 122 can receive beacon symbols transmitted by the base station 102. The beacon symbol can be interpreted to obtain desired information. For example, the beacon symbol can be transmitted as described above to convey static and dynamic information. In this regard, the mobile device 116 and 122 can evaluate the beacon and/or subcarrier index to determine information. In one example, the mobile device 116 and 122 can determine information from the beacon symbol based on index information known by the mobile device 116 and 122 (e.g. the mobile device can match the subcarrier index to a look-up table to gather desired information). In another example, where the groups are equally divided, the mobile device can discern the static information by taking the subcarrier index modulo the number of subcarriers in each group. The dynamic information can be discerned by taking the subcarrier index integer divided by the number of subcarriers in each group. Thus, the example above can render 31 mod 128=31 for the beacon subcarrier index and 31 div 128=0 for the dynamic information for the first symbol and 159 mod 128=31 for the beacon subcarrier index and 159 div 128=1 for the dynamic information for the second symbol. It is to be appreciated, however, that the data derived from the group and the data derived from the subcarrier index within the group can both be dynamic as well (or static, or the reverse combination than that described, for example).

Figure 2:
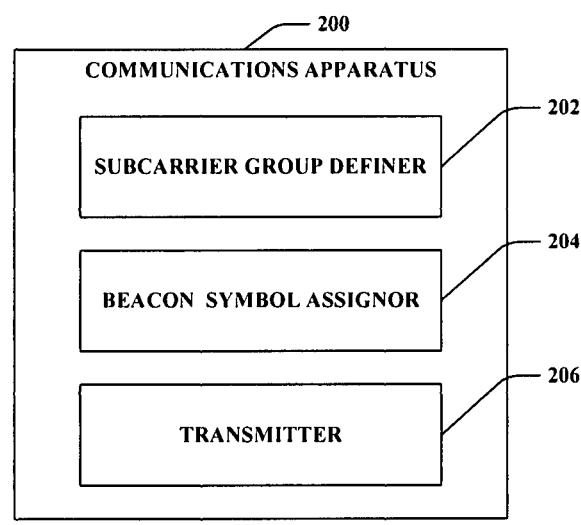
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that transmits one or more beacon symbols. The communications apparatus 200 can include a subcarrier group definer 202 that can separate a plurality of useable subcarriers into one or more groups, a beacon symbol assignor 204 that selects a subcarrier and/or a group for transmitting a beacon symbol (e.g. an OFDM symbol) based on static and/or dynamic information desired, and a transmitter 206 that broadcasts the beacon symbol. In one example, the communications apparatus 200 can desire to send dynamic information with static beacon symbols. In this regard, the subcarrier group definer 202 can separate a plurality of useable subcarriers into a number of groups needed to send the dynamic information. The beacon symbol assignor 204 can select a subcarrier within a group on which to transmit the beacon symbol. The subcarrier is chosen from one of the groups based on the dynamic information to be sent, and a subcarrier within the group is chosen for the beacon symbol. The transmitter 206 can transmit the beacon symbol on the selected subcarrier during a respective time period.

In one example, a communication apparatus 200 can desire to transmit n possible values of dynamic data with beacon symbols. The available bandwidth for sending the beacon symbols can be divided into n groups by the subcarrier group definer 202. These can be evenly divided and in one example can be such that the number of subcarriers in a group is substantially equal to the total number of available subcarriers divided by n (e.g. where the groups are contiguous and use the entire amount of available subcarriers). For example, if three indicators of dynamic information are desired (e.g. for values 0, 1, and 2), the available number of subcarriers can be divided into 3 groups. In one embodiment, the groups are evenly distributed. It is to be appreciated, however, that the subcarrier group definer 202 can create the groups as having different numbers of elements, for example, where a look-up table or other identifier can be used to interpret the chosen subcarriers. Using evenly distributed groups, the beacon symbol assignor 204 can select a subcarrier for transmitting a beacon symbol. In one example, the beacon symbol assignor 204 can select a group of subcarriers depending on desired dynamic information to send. In the example above, one of 3 groups of subcarriers (each having S/3 subcarriers available, where S is the total number of useable subcarriers). The beacon symbol assignor 204 can also select a subcarrier within the group that relates to desired static information to transmit. In this way, the subcarriers can have 3 positions, for example, for the desired subcarrier, and the chosen position indicates the additional dynamic information (e.g. 0, 1, or 2). The communications apparatus 200 can utilize the transmitter 206 to broadcast the beacon on the subcarrier during a respective time period, for example.

Figure 3:
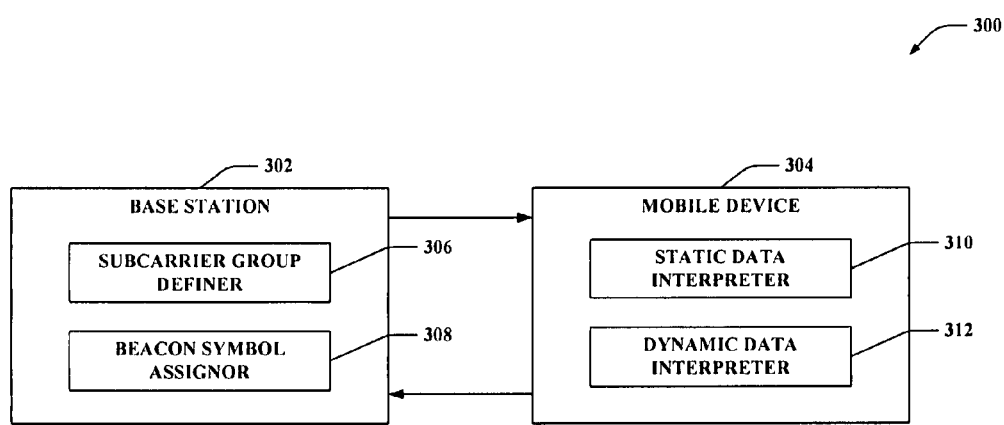
FIG. 3 is an illustration of an example wireless communications system that effectuates transmitting beacon symbols with static and dynamic information.

Now referring to FIG. 3, illustrated is a wireless communications system 300 that communicates static and dynamic information in beacon symbols. System 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, in one example.

Base station 302 can include subcarrier group definer 306 that separates bandwidth available for beacon transmission into one or more groups of subcarriers and a beacon symbol assignor 308 that selects a subcarrier, based on static and dynamic information to be sent, for transmitting a beacon symbol. As described, subcarrier for the beacon symbol can be selected to represent desired static and dynamic data. In this regard, the beacon symbol assignor 308 can choose a group of subcarriers, the group indicative of dynamic information, and a subcarrier within the group, indicative of static beacon information, or vice versa. Therefore, a total available number of subcarriers can be partitioned into n groups where n also corresponds to the number of dynamic information identifiers. Each group can represent substantially the same static data subcarriers as another group such that transmitting the static information on a selected subcarrier will have the substantially the same effect to a device receiving the static data regardless of the group. The selected group can indicate the desired dynamic data regardless of which subcarrier within the group is utilized to transmit the beacon symbol. For example, bandwidth with 111 useable subcarriers can be separated into 3 groups having 37 carriers enumerated from 0 to 36. Thus, what is actually subcarrier 37 can be subcarrier 0 on group 2, and actual subcarrier 74 can be subcarrier 0 as well, but for group 3. In this regard, a beacon symbol to be sent out on subcarrier 0 can be sent on subcarrier 0 of group 1 (actual subcarrier 0), group 2 (actual subcarrier 37), or group 3 (actually subcarrier 74). The group on which it is sent can indicate the dynamic information (1, 2, or 3; or 0, 1, or 2, for example). Upon choosing the subcarrier, the communication can be transformed into a time domain, such as by using an inverse fast Fourier transform (IFFT), for example.

The mobile device 304 can comprise a static data interpreter 310 that can resolve static beacon data from a beacon symbol and a dynamic data interpreter 312 that can discern dynamic data from a beacon symbol. As described, the available bandwidth for beacon transmission can be represented as a plurality of subcarriers grouped according to a desired dynamic information threshold. In one example, the mobile device 304 can receive a beacon transmission and perform an FFT on the broadcast to transform the tones of the bandwidth to the frequency domain. The mobile device 304 can determine a subcarrier index on which the beacon symbol was sent and utilize this information to interpret the beacon symbol. According to an example, the mobile device 304 can know of the grouping and/or a number of subcarriers in each group. The static data interpreter 310 can take the subcarrier index for the beacon symbol modulo the number of subcarriers in each group to obtain the static beacon symbol information. It is to be appreciated that the static beacon code information can be a beacon code, comprised of one or more beacon symbols, that repeats on a periodic basis. The dynamic data interpreter 312 can integer divide the subcarrier index by the number of subcarriers in each group to obtain the dynamic information. In the example given above, if the beacon symbol is transmitted on actual subcarrier 74, the static data interpreter 310 can take 74 modulo 37=0, which represents the subcarrier for the static data. The dynamic data interpreter 312 can take 74 integer divided by 37=2, which is the dynamic data. In one example, the mobile device 304 can desire only the dynamic or static data such that the other need not be read to facilitate efficient interpreting.

According to another example, the beacon can transmit on 111 subcarriers at positions 5, 11, 30, and 2 in a repeating sequence. Dynamic data 2, 0, 1, 1 can be desired to be sent with the beacon in 4 consecutive beacon symbol periods. The subcarrier group definer can separate the 111 subcarriers into 3 groups of 37 subcarriers each. Where the beacon is transmitting from the start, the beacon symbol assignor 308 can assign the symbol for subcarrier 5 at group 2, subcarrier 5, which is actual subcarrier 79 in this example, and transmit the symbol on actual physical subcarrier index 79. The mobile device 304 can receive the beacon symbol, the static data interpreter 310 can obtain the static beacon symbol for position 5 by taking 79 modulo 37=5, and the dynamic data interpreter 312 can obtain the dynamic data by taking 79 div 37=2. The base station 302 can then send respectively at actual subcarrier indices 11, 67, and 39 to effectuate transmitting the remaining desired combinations. In this way, the actual subcarrier index can act as a virtual subcarrier index for a given group (e.g. 79 is the actual subcarrier index for virtual subcarrier index 2 of group 2). It is to be appreciated that the groups need not be contiguous, rather in this example, the 111 subcarriers can be split into 3 groups of 35, for example, where the last two subcarriers in the groups are reserved or forbidden. Moreover, the subcarriers can be grouped by even/odd, such that odd number represent a group and evens another for transmitting an effective 0 or 1 (every 3, 4, . . ., k schemes can be used as well). Additionally, as mentioned, the groups of subcarriers can be of disparate sizes as well. It is to be appreciated that the static and dynamic data can be unrelated, in one example, such that it can causes different actions or require different processing from a given device and/or can be processed by one device and not another though both receive the static and dynamic information by virtue of the beacon signal composition described herein. For example, the static information can comprise a sequential, periodic, and repetitive beacon message that is interpreted by one or more mobile devices whereas the dynamic information, effectuated as described, can be utilized by disparate devices such as public safety terminals. It is to be appreciated that this is just one of many possible scenarios for utilizing progressive beacon information.

Figure 4:
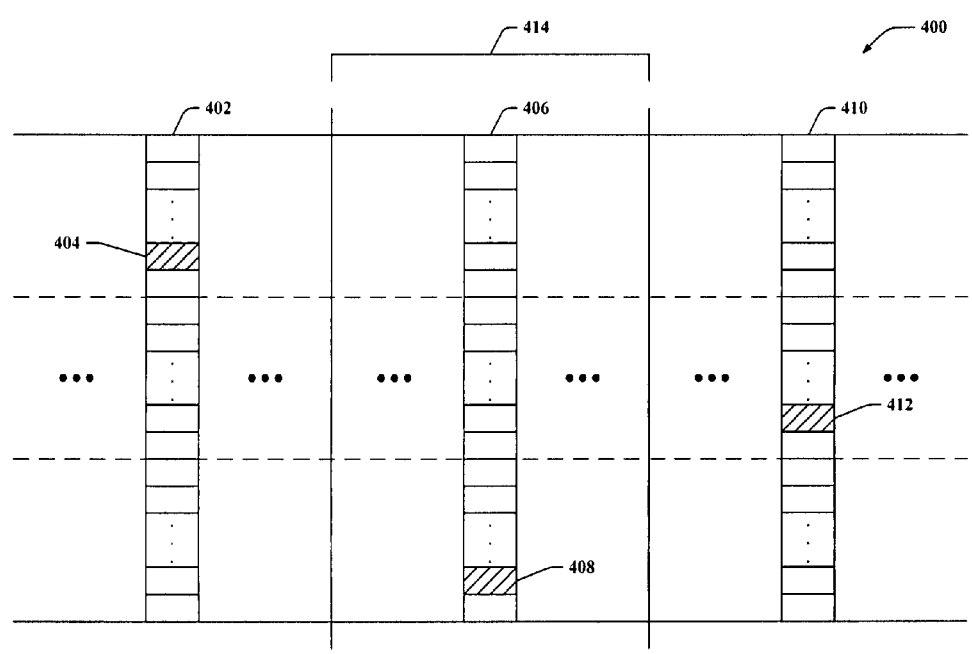
FIG. 4 is an illustration of example superframes and symbol periods utilized in wireless communications systems.

Now referring to FIG. 4, a representation of bandwidth over a period of time 400 is displayed. The bandwidth is represented by a plurality of subcarriers for given symbol periods 402, 406, and 410, and the symbol period can be one of a plurality within one or more superframes 414, which can have predetermined time durations for example. Each of the shown symbol periods 402, 406, and 410 can broadcast a beacon symbol 404, 408, and 412, respectively, represented as substantially the only OFDM symbol in the symbol period utilizing power (which can be substantially all the power that is available since the other symbols are not powered). As shown, the beacon symbol 404, 408, and/or 412 can be transmitted on different subcarriers and/or at different time periods each superframe. It is to be appreciated that multiple beacon symbols can be transmitted per superframe; also, one or more superframes can be skipped and not transmit a beacon symbol as well.

According to an example, the beacon symbols 404, 408, and 412 can relate to the same or different sectors for a given base station, one or more carriers for a single sector, and/or the like. For instance, the base station can have a plurality of transmitters that facilitate communication in a plurality of sectors, and a beacon symbol is sent for each sector on a different subcarrier. In another example, a sector can have a number of carriers that can send beacon symbols as well. Thus, the beacon symbol 404 can relate to a sector or carrier, 408 to another, and 412 to another. As shown, the subcarriers for the symbol periods 402, 406, and 410 are grouped, indicated by the dotted lines, into three groups each. The three groups can have an equal or different number of subcarriers as explained supra. The grouping can represent dynamic information sent with a beacon symbol where the static beacon symbol can be sent on a subcarrier at a position in the group. In this regard, the assigned subcarrier can be the same in each group; the choice of group indicates dynamic data.

In an example, the symbol periods 402, 406, and 410 can transmit a beacon symbol on a subcarrier. As shown, the respective beacon symbols 404, 408, and 412 can be substantially the same according to the static beacon data transmitted (e.g. the beacon symbols 404, 408, and 412 are in virtual position 1, just in different groups). Thus, a mobile device listening for the beacon can obtain the beacon position as 1 regardless of whether beacon symbol 404, 408, or 412 is sent. However, the chosen subcarriers are in different groups indicating different progressive data. For example, beacon symbol 404 is transmitted in group 2, beacon symbol 408 in group 0, and beacon symbol 412 in group 1. This can be observed by a receiving device as well and utilized to obtain the data. Thus, the data of this bandwidth 400 is transmitted as 3 beacon symbols mapping to subcarrier 1 with dynamic data (2, 0, 1) received at respective time periods. As mentioned, the grouping need not be contiguous, for example there can be symbols between groups that are not part of a group. The groups can also be disjoint, as shown, such that one subcarrier is only in one group, for example. It is to be appreciated that the group and/or subcarrier can be chosen according to a coding scheme, such as a maximum distance separable (MDS) code, a Reed-Solomon code or substantially any polynomial based code, for example.

In one example, the static beacon symbols can relate to information about the transmitting sector or base station, for example. The beacon symbols can be part of a code to send information in multiple transmissions. In one example, the beacon code can be a 12-bit code transmitted in multiple symbols (substantially any combination of symbols and available subcarriers such that their product is at least $2^{\wedge}$(bit size of the code). Thus, in this example, for 256 available beacons, the code can be sent in 16 symbols since 256*16 is at least $2^{\wedge}12$. In this example, there can be 512 total available subcarriers in the bandwidth, and the subcarriers can be in 2 groups of 256. In this example, not only can the 12-bit beacon code be transmitted statically (and in a repeating period manner in one example), but a zero or one can be sent with each beacon symbol depending on the group chosen as progressive data. Thus, each subcarrier index out of a possible 256, can transmit at subcarrier index i, or index i+256. To the receiver of the beacon code, the chosen group can have little to no effect, but a receiver desiring the dynamic or progressive information can interpret the dynamic data (the chosen group) additionally or alternatively.

Figure 5:
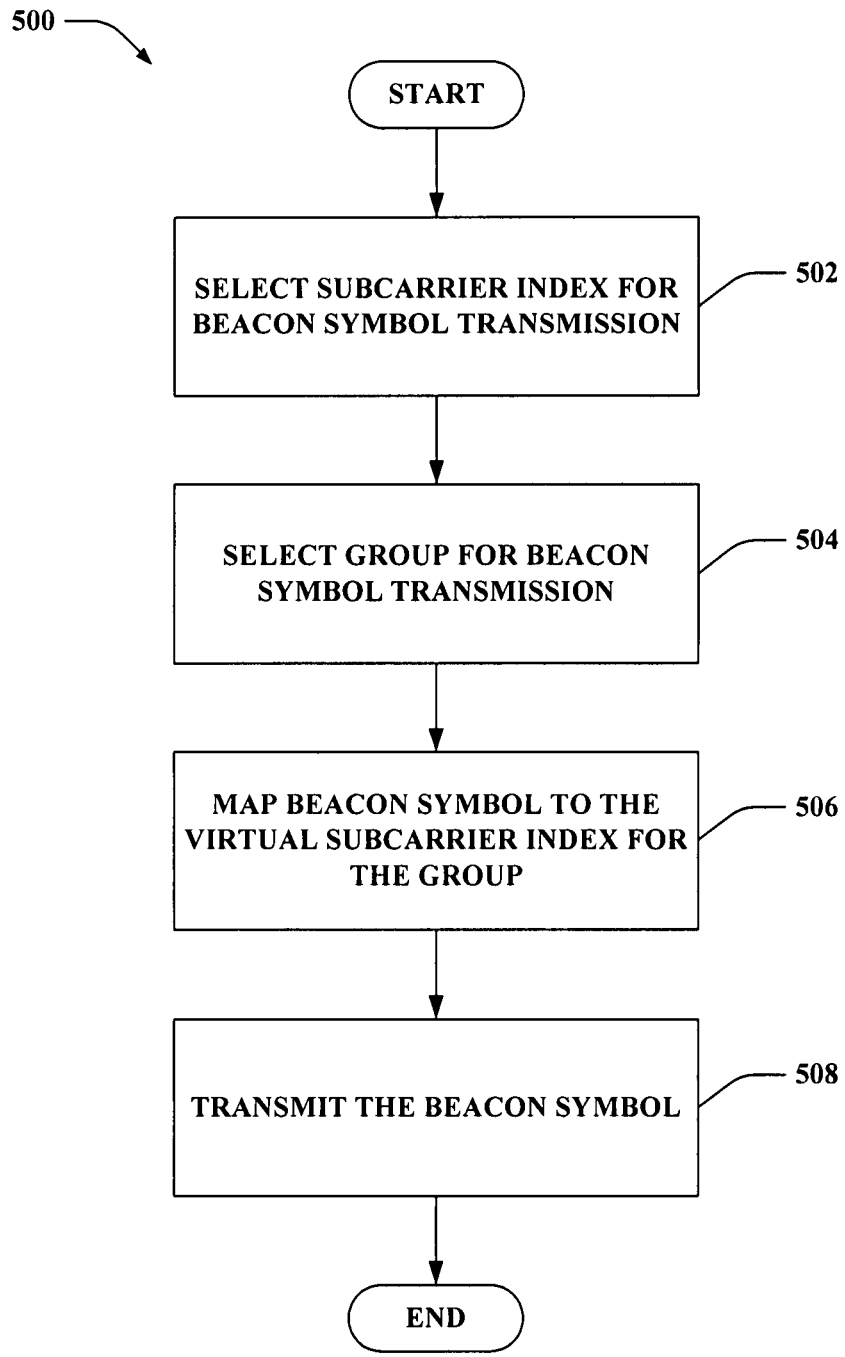
FIG. 5 is an illustration of an example methodology that facilitates transmitting beacon symbols with progressive and static information.
Figure 6:
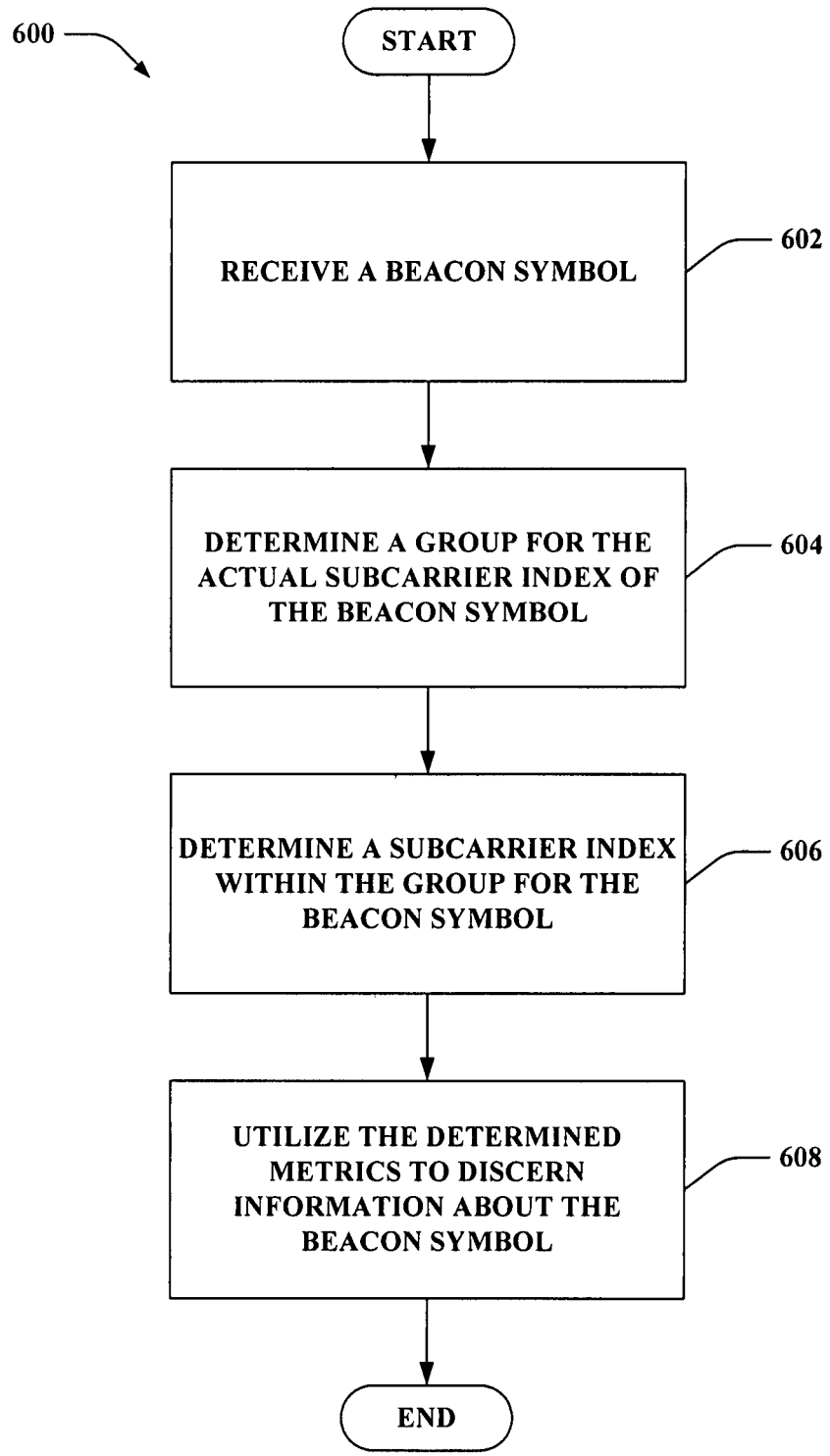
FIG. 6 is an illustration of an example methodology that facilitates receiving and decoding static and dynamic information from beacon symbols.

Referring to FIGS. 5-6, methodologies relating to broadcasting beacons or symbols thereof in groups of subcarriers to facilitate communicating progressive information are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates transmitting beacon symbols on indices of grouped subcarriers to facilitate transmitting additional modifiable information with the beacon symbol. At 502, a subcarrier index is selected for beacon symbol transmission. The subcarrier index can be within the range of a number of total available subcarriers divided by a grouping index, for example. Additionally, the subcarrier index can be one existing in more than one group of subcarriers such that an ultimate (or virtual) index chosen in the total bandwidth can indicate additional data. For example, the total number of subcarriers can be grouped into n groups and the subcarrier index can be from 0 . . . ((total number of available subcarriers)/n). In this regard, selecting a subcarrier index can relate to selecting a virtual subcarrier index that can be found in more than one of the subcarrier groupings.

At 504, a group of subcarriers is selected for the symbol transmission. As described above, the groups can have an equal number of available subcarriers and can be chosen based on desiring to send additional dynamic information with the static beacon symbol. At 506, the beacon symbol can be mapped to the virtual subcarrier index for the chosen group. According to an example, the symbol can be mapped to a subcarrier having actual index ((group number*number of subcarriers in each group)+desired index). For instance, in a 512 subcarrier bandwidth having two groups of 256 available subcarriers for transmitting beacon symbols, a selected subcarrier index of 34 and a selected group of 1 can cause the beacon symbol to be mapped to actual subcarrier index (1*256)+34=290. Additionally, it is to be appreciated that the group configuration can be different from sequential as shown (e.g. group 1 can be the first group, such that the actual subcarrier index can be 34). At 508, the beacon symbol is transmitted. The symbol can be received by a mobile device or other network node, for example.

Now referring to FIG. 6, a methodology 600 that facilitates receiving a beacon symbol comprising static and dynamic information is illustrated. At 602, a beacon symbol is received; as mentioned, this can comprise static and dynamic information as shown above. Moreover, as mentioned, the dynamic and static information can be unrelated and/or can be processed separately within a device and/or separately among disparate devices, for example. At 604, a group for the actual subcarrier index of the beacon symbol is determined. For example, the grouping of the subcarrier can be known, and the actual subcarrier index can be determined by applying the group scheme to the subcarriers. For example, the subcarriers can be in two groups split on the middle subcarrier; the index of the actual subcarrier can be divided by the number of symbols in the groups to determine the group, and thus the dynamic information, for example.

At 606, which can be performed in lieu of, or along with, step 604, a subcarrier index within the group (or a virtual subcarrier index, for example) is determined. This index can provide static information regarding the beacon symbol itself and can transmit according to a period or code. The virtual subcarrier index can be the index within the group not taking into account the position in the actual total number of subcarriers, such that it can be determined for contiguous groups having the same number of subcarriers in each group by the physical subcarrier index modulo the number of beacon symbols available within each group. At 608, the determined group and/or virtual subcarrier index can be used to discern information about the beacon symbol. As mentioned, the static beacon code utilizing the subcarrier index can be transmitted in a repeating manner where the grouping or dynamic information can change or remain for each beacon symbol period.

It will be appreciated that, in accordance with one or more aspects described herein, inferences can be made regarding selecting or determining a grouping of subcarriers or a subcarrier within a group to utilize. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting one or more virtual subcarrier indices based on dynamic information to be sent. By way of further illustration, an inference can be made with regard to similar dynamic information transmissions and/or subcarrier groupings. It will be appreciated that the foregoing examples are illustrative in nature and are not intended to limit the number of inferences that can be made or the manner in which such inferences are made in conjunction with the various embodiments and/or methods described herein.

Figure 7:
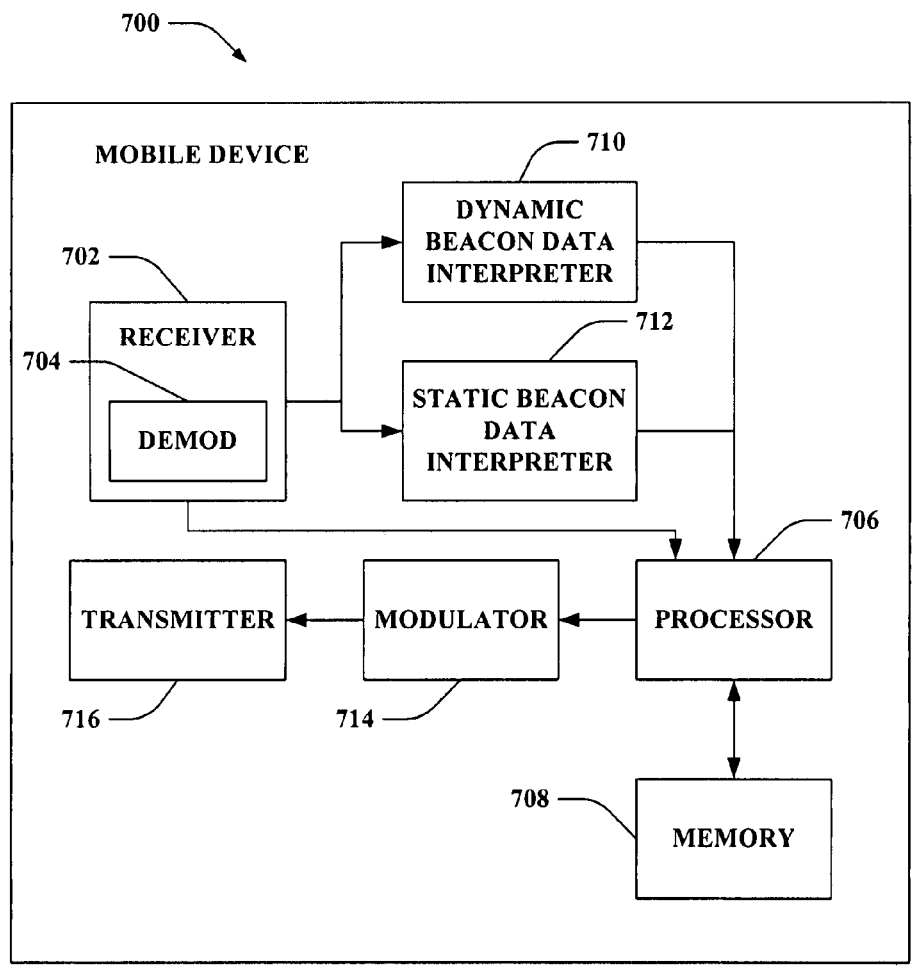
FIG. 7 is an illustration of an example mobile device that facilitates receiving beacon symbols having two points of information.

FIG. 7 is an illustration of a mobile device 700 that facilitates receiving and decoding beacon symbols having dynamic and/or static information. In one example, the mobile device 700 operates in an OFDM communication network where one or more beacon symbols can be sent in a superframe, for example. The beacon symbols can be transmitted periodically and/or according to a repeating or infinite code, for instance. Mobile device 700 comprises a receiver 702 that receives a signal from, for example, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a dynamic beacon data interpreter 710 that can facilitate decoding dynamic data from one or more beacon symbols at least in part by identifying a subcarrier group to which a subcarrier used to transmit the beacon symbol is a part, in one example. Additionally, in an example, the receiver 702 can be operatively coupled to a static beacon data interpreter 712 that can decode static data from a beacon symbols based at least in part on a subcarrier index within the subcarrier group. According to another example, it is to be appreciated that the interpreters 710 and 712 can have the opposite functionalities as well. As described, the mobile device 700 can receive a beacon symbols can utilize the dynamic beacon data interpreter 710 to determine a subcarrier group for the subcarrier used to transmit the beacon symbol. In one example, this can be discerned by the dynamic beacon data interpreter 710 determining or knowing a grouping of the subcarriers and determining the group chosen based on a look-up table or by integer dividing the actual subcarrier index by the number of subcarriers in a given group. Moreover, static beacon data can be discerned from the beacon symbol by utilizing the static beacon data interpreter 712 to obtain the subcarrier index within the group (e.g. the virtual subcarrier index), which can be determined by look-up table or taking the actual physical subcarrier index modulo the number of subcarriers in each group of subcarriers where the groups have an equal number of useable subcarriers, for example. It is to be appreciated that the mobile device 700 can comprise either the static beacon data interpreter 712 or the dynamic beacon data interpreter 710 and/or can be concerned with interpreting only one of the types of data, in one example. Thus, the static and dynamic information can be unassociated or separately processed by different devices, for example.

Mobile device 700 still further comprises a modulator 714 and a transmitter 716 that can transmit a communication signal to, for instance, a base station, another mobile device, etc. As described previously, in one example, the mobile device 700 can receive and provide beacon symbol information from one or more beacon symbol transmitters to one or more other beacon symbol transmitters to facilitate effective decoding dynamic and/or static data in a beacon symbol. Although depicted as being separate from the processor 706, it is to be appreciated that dynamic beacon data interpreter 710, static beacon data interpreter 712 and/or modulator 714 can be part of processor 706 or a number of processors (not shown).

Figure 8:
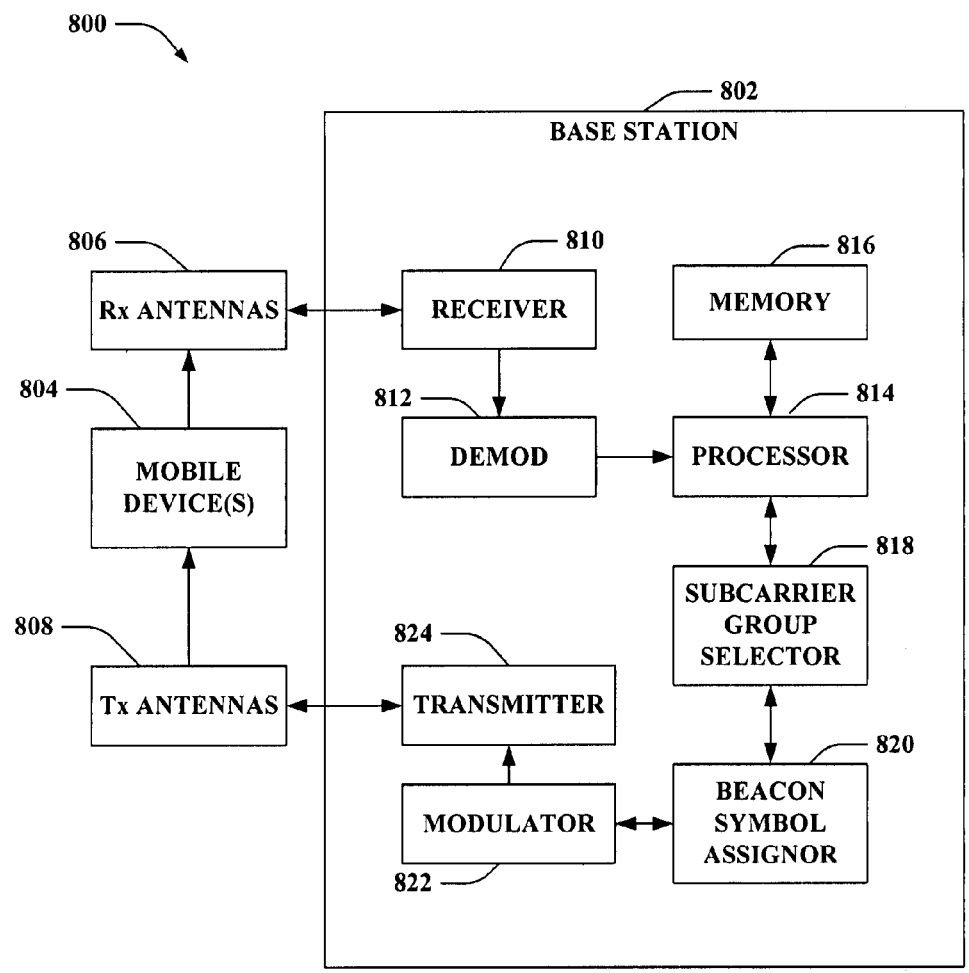
FIG. 8 is an illustration of an example system that facilitates broadcasting beacon symbols on subcarriers within groups of subcarriers.

FIG. 8 is an illustration of a system 800 that facilitates transmitting one or more beacon symbols comprising static and dynamic data. For example, the system 800 can operate in an OFDM communication network where beacon symbols can be sent in symbol periods of a superframe using one or substantially one subcarrier. The system 800 comprises a base station 802 (e.g., access point, . . . ) with a receiver 810 that receives signal(s) from one or more mobile devices 804 (and a demod 812 that can demodulate such signals) through a plurality of receive antennas 806, and a transmitter 824 that transmits to the one or more mobile devices 804 through a transmit antenna 808. The transmitter 824 can transmit one or more beacon symbols related to the base station 802, for example. The beacon symbol can identify information regarding the base station 802 and/or one or more sectors thereof (within the static and/or dynamic data). For example, the beacon symbol can serve to identify the base station 802 and/or sector; additionally, the beacon symbol can be part of a beacon message or code that spans a plurality of beacon symbols in one example; this can transmit periodically in one example as well. The beacon symbol can be modulated to a frequency domain by the modulator 822 and transmitted by one or more transmitter antennas 808 using the transmitter 824, for instance.

For example, the base station 802 can send the static beacon code information by leveraging the beacon symbol assignor 820 to select a subcarrier index that indicates desired information for transmitting the beacon symbol. Additionally, the base station 802 can send dynamic information with the beacon symbols, such as by utilizing a subcarrier group selector 818 to choose a group of subcarriers for sending the beacon symbol; the selected subcarrier index can be found in each group of useable subcarriers (such as a virtual subcarrier, for example), and the one in the selected group is utilized to transmit the beacon symbol. Thus, the beacon symbol assignor 820 can locate the desired subcarrier index within the selected subcarrier group for sending the beacon symbol. The selected group can indicate the additional dynamic or progressive information as described previously. Additionally or alternatively, some or all of the subcarrier group selector 818 and beacon symbol assignor 820 can reside in, or be implemented by, the processor 814. Furthermore, the memory 816 can comprise instructions to facilitate the foregoing functionality. Moreover, the memory 816 can comprise information regarding subcarrier groups and subcarrier index within the group to use in transmitting the beacon symbols as well, for example.

Figure 9:
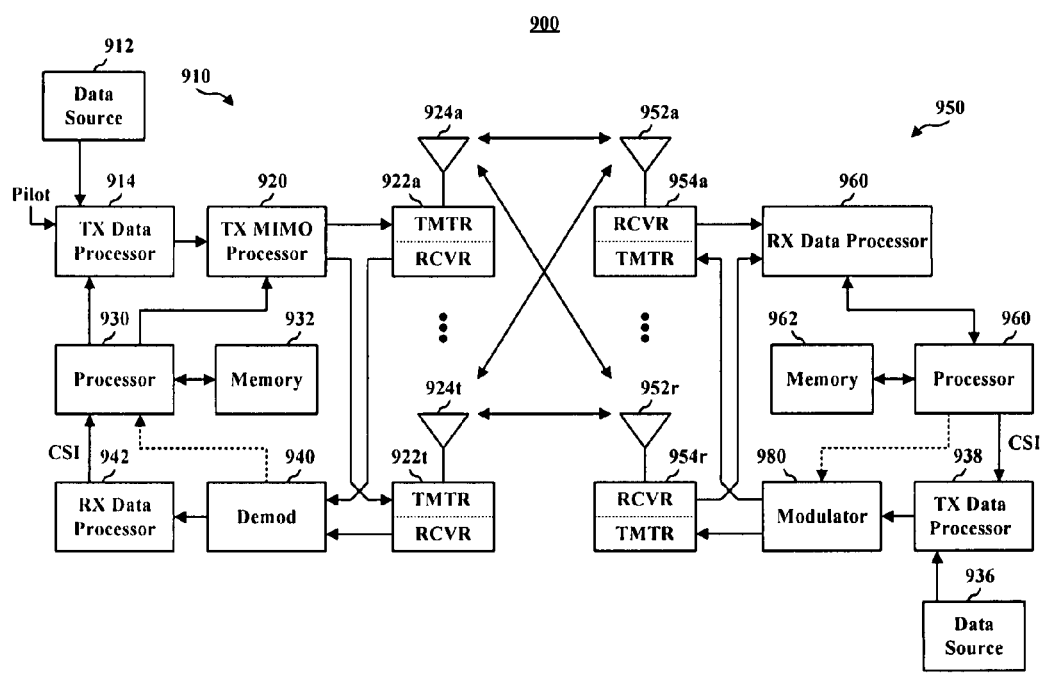
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
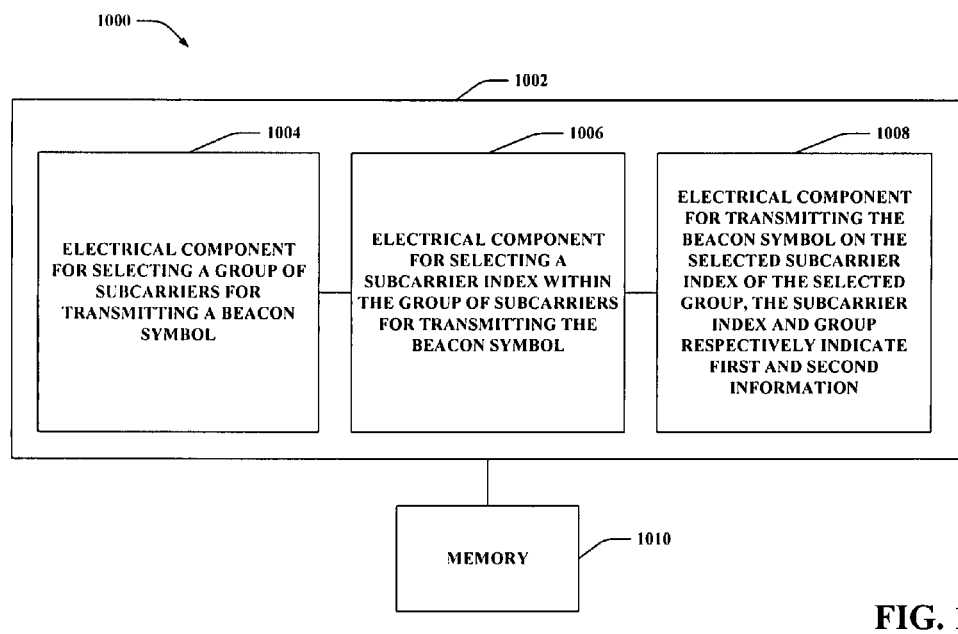
FIG. 10 is an illustration of an example system that transmits beacon symbols on a subcarrier within a group of such.

With reference to FIG. 10, illustrated is a system 1000 that broadcasts beacon symbols representing static and dynamic information in a wireless communications system. For example, system 1000 can reside at least partially within a base station It is to be appreciated that system 1000 is represented as including functional blocks, which can be functional blocks that represent functions implemented by a processor, software, or combination thereof (e.g., firmware).

System 1000 includes a logical grouping 1002 of electrical components that can act in conjunction. For instance, logical grouping 1002 can include an electrical component for selecting a group of subcarriers for transmitting a beacon symbol 1004. For example, bandwidth for communicating in a wireless communication system can comprise a plurality of subcarriers that can be modulated to indicate information. A beacon symbol, as described, can be sent on one or substantially one of the subcarriers to provide a powerful signal having information about the beacon or transmitting entity. The subcarriers can be partitioned into groups to allow additional information to be sent; in this regard, electrical component 1004 can select one of the groups for transmitting the signal. Further, logical grouping 1002 can comprise an electrical component for selecting a subcarrier index within the group of subcarriers for transmitting the beacon symbol 1006. As described supra, this can represent additional information, such as static beacon symbol information. In one example, a beacon message can be sent as a plurality of repeating code sequences. In this regard, information can be stored and accumulated by a receiver. Additionally, each group of subcarriers can have the desired index, so the group chosen for each symbol by electrical component 1004 can indicate additional information that can change with each beacon symbol, for example. Thus, logical grouping 1002 can include an electrical component for transmitting the beacon symbol on the selected subcarrier index of the selected group, the subcarrier index and group respectively indicate first and second information 1008. A receiver of the information can decode both the first and second information and utilize them as desired. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
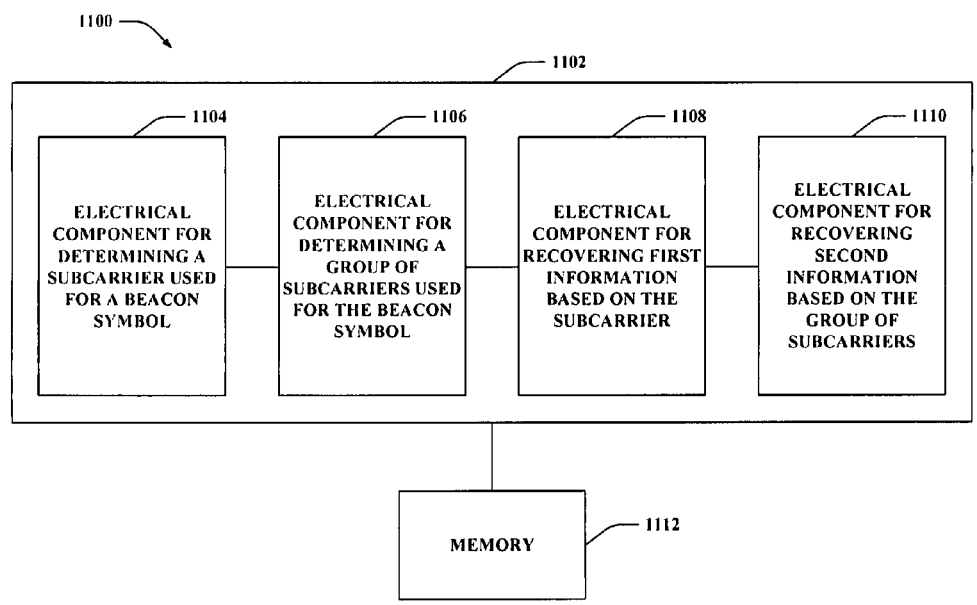
FIG. 11 is an illustration of an example system that receives a plurality of beacon symbols having static and dynamic data.

Turning to FIG. 11, illustrated is a system 1100 that receives and decodes beacon symbols comprising static and dynamic progressive information. System 1100 can reside within a mobile device, for instance. As depicted, system 1100 includes functional blocks that can represent functions implemented by a processor, software, or combination thereof (e.g., firmware). System 1100 includes a logical grouping 1102 of electrical components that facilitate receiving and decoding the beacon symbols. Logical grouping 1102 can include an electrical component for determining a subcarrier used for a beacon symbol 1104. For example, as described with reference to the previous figure, the system 1100 can use a subcarrier index within a group to present at least two data points. The subcarrier can be determined in a number of ways (e.g. using a look-up table or taking the actual subcarrier position modulo the number of subcarriers in each group where the groups are contiguous and have the same number of subcarriers). Moreover, logical grouping 1102 can include an electrical component for determining a group of subcarriers used for the beacon symbol 1106. The group used can indicate additional information that can change for each beacon symbol. Thus, the static information conveyed by the choice of subcarrier can be sequential beacon code information that is used to identify a sector in one example. Further, logical grouping 1102 can comprise an electrical component for recovering first information based on the subcarrier 1108. As described, this can be periodic beacon symbol information that transmits to convey a multiple part beacon message. Additionally, this can be substantially the same symbol being transmitted on the same subcarrier to allow easy identification of the transmitter for example. Also, logical grouping 1102 can include an electrical component for recovering second information based on the group of subcarriers 1110. The chosen group can change for each symbol as the subcarriers selected can appear in each group. Thus, dynamic or progressive information can be sent with the beacon in this regard. Additionally, system 1100 can include a memory 1112 that retains instructions for executing functions associated with electrical components 1104, 1106, 1108, and 1110. While shown as being external to memory 1112, it is to be understood that electrical components 1104, 1106, 1108, and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of transmitting first and second sets of beacon information data via a beacon symbol, comprising:
    partitioning a plurality of available subcarriers into a plurality of groups of subcarriers, each group including a number of subcarriers respectively associated with a number of subcarrier indices;
    selecting one group of subcarriers from the plurality of groups of subcarriers to represent the first set of beacon information data;
    selecting a subcarrier index to represent the second set of beacon information data;
    using the selected subcarrier index to identify an associated subcarrier within the selected group; and
    transmitting the beacon symbol on the identified subcarrier, wherein the identified subcarrier on which the beacon symbol is transmitted is indicative of both the selected subcarrier index and the selected group of subcarriers.

2. The method of claim 1, wherein the group partition is fixed.

3. The method of claim 2, wherein the plurality of groups are contiguous and comprise the same number of available subcarriers.

4. The method of claim 1, wherein the subcarrier index and/or the group are selected based on a beacon coding scheme.

5. The method of claim 4, wherein the beacon coding scheme is a maximum distance separable (MDS) or Reed-Solomon coding scheme.

6. The method of claim 1, wherein the second set of beacon information data relates to static data of a beacon message and the first set of beacon information data relates to dynamic information, and wherein a quantity of said groups in said plurality of groups is equal to a quantity of different instances of said dynamic information.

7. A wireless communications apparatus, comprising:
    at least one processor configured to select a group of subcarriers defined by a predetermined multi-group partition of available subcarriers to represent dynamic beacon data, wherein the sub carriers of each group of the multi-group partition are respectively associated with subcarrier indices, said at least one processor further configured to select a subcarrier index to represent static beacon data, to use the selected subcarrier index to identify an associated subcarrier within the selected group, and to transmit a beacon symbol on the identified subcarrier, wherein the identified subcarrier on which the beacon symbol is transmitted is indicative of both the selected subcarrier index and the selected group of subcarriers; and a memory coupled to the at least one processor.

8. The wireless communications apparatus of claim 7, wherein a quantity of groups in said multi-group partition is equal to a quantity of different instances of said dynamic beacon data.

9. The wireless communications apparatus of claim 7, wherein the group of subcarriers are contiguous over a total number of available subcarriers.

10. The wireless communications apparatus of claim 7, wherein the static beacon data is a portion of a periodic beacon code, the beacon code comprises a plurality of beacon symbols.

11. The wireless communications apparatus of claim 10, wherein the dynamic beacon data can change regardless of the periodic beacon code according to the selected group.

12. The wireless communications apparatus of claim 7, wherein the subcarrier index and/or the group are selected based at least in part on a beacon coding scheme.

13. The wireless communications apparatus of claim 12, wherein the beacon coding scheme is a maximum distance separable (MDS) or Reed-Solomon coding scheme.

14. A wireless communications apparatus for transmitting static and dynamic beacon information in a beacon code, comprising:
  means for selecting a group of subcarriers defined by a predetermined multi-group partition of available subcarriers, wherein the subcarriers of each group of the multi-group partition are respectively associated with subcarrier indices;
  means for selecting a subcarrier index;
  means for using the selected subcarrier index to identify an associated subcarrier within the selected group; and
  means for transmitting a beacon symbol on the identified subcarrier;
  wherein the selected subcarrier index and the selected group respectively indicate first, static beacon information and second, dynamic beacon information, and wherein the identified subcarrier on which the beacon symbol is transmitted is indicative of both the selected subcarrier index and the selected group of subcarriers.

15. The wireless communications apparatus of claim 14, further comprising:
  means for encoding the first beacon information based on a first coding scheme to generate first coded data; and
  means for selecting the subcarrier index based at least in part on the first coded data.

16. The wireless communications apparatus of claim 15, further comprising:
  means for encoding the second beacon information based on a second coding scheme to generate second coded data; and
  means for selecting the group based at least in part on the second coded data.

17. The wireless communications apparatus of claim 14, wherein the groups are groups of contiguous subcarriers, and all of the groups comprise the same number of available subcarriers.

18. The wireless communications apparatus of claim 14, wherein the subcarrier index and/or the group of subcarriers are selected based on a beacon coding scheme.

19. The wireless communications apparatus of claim 14, wherein a quantity of groups in said multi-group partition is equal to a quantity of different instances of said second, dynamic information.

20. A computer program product, comprising:
  a non-transitory computer-readable medium comprising:
    code for causing at least one computer to partition a plurality of available subcarriers into a plurality of groups of subcarriers, each group including a number of subcarriers respectively associated with a number of subcarrier indices;
    code for causing the at least one computer to select one group of subcarriers from the plurality of groups of subcarriers to represent a first set of beacon information data;
    code for causing the at least one computer to select a subcarrier index, wherein the selected subcarrier index represents a second set of beacon information data;
    code for causing the at least one computer to use the selected subcarrier index to identify an associated subcarrier within the selected group; and
    code for causing the at least one computer to transmit a beacon symbol on the identified subcarrier, wherein the identified subcarrier on which the beacon symbol is transmitted is indicative of both the selected subcarrier index and the selected group of subcarriers.

21. The computer program product of claim 20, wherein the second set of information data relates to static data of a beacon message and the first set of information data relates to dynamic information, and wherein a quantity of said groups in said plurality of groups is equal to a quantity of different instances of said dynamic information.

22. A wireless communication apparatus, comprising:
  a processor configured to:
    select a group of subcarriers defined by a predetermined multi-group partition of available subcarriers, wherein the sub carriers of each group of the multi-group partition are respectively associated with subcarrier indices;
    select a subcarrier index;
    use the selected subcarrier index to identify an associated subcarrier within the selected group; and
    transmit a beacon symbol on the identified subcarrier, wherein the selected subcarrier index and the selected group respectively indicate first beacon information and second beacon information, and wherein the identified subcarrier on which the beacon symbol is transmitted is indicative of both the selected subcarrier index and the selected group of subcarriers; and
  a memory coupled to the processor.

23. The wireless communication apparatus of claim 22, wherein the first beacon information is static information and the second beacon information is dynamic information, and wherein a quantity of groups in said multi-group partition is equal to a quantity of different instances of said dynamic information.

24. A method for decoding beacon symbols that convey first beacon information and second beacon information, comprising:
  receiving a beacon symbol;
  determining a subcarrier on which the beacon symbol is received;

determining a group of subcarriers that contains the determined subcarrier, wherein the determined group is one of a plurality of groups defined by a predetermined multi-group partition of a total number of available subcarriers and is indicative of the second beacon information, and wherein the subcarriers of each said group are respectively associated with subcarrier indices; and identifying, over the determined group of subcarriers, a subcarrier index associated with the determined subcarrier, wherein the identified subcarrier index is indicative of the first beacon information;

wherein the determined subcarrier on which the beacon symbol is received is indicative of both the identified subcarrier index and the determined group of subcarriers.

25. The method of claim 24, wherein the group of subcarriers is determined by taking (a) an actual subcarrier index, over the total number of available subcarriers and corresponding to the determined subcarrier, integer divided by (b) a same number of subcarriers commonly contained in each group in the plurality of groups.

26. The method of claim 24, wherein the subcarrier index is identified by taking an actual subcarrier index, over the total number of available subcarriers and corresponding to the determined subcarrier, modulo a same number of subcarriers commonly contained in each group in the plurality of groups.

27. The method of claim 24, further comprising:
obtaining at least one non-binary symbol based on the identified subcarrier index; and
decoding the at least one non-binary symbol.

28. The method of claim 27, the at least one non-binary symbol is a portion of a beacon signal.

29. The method of claim 24, wherein the second beacon information is dynamic information, and wherein a quantity of said groups in said plurality of groups is equal to a quantity of different instances of said dynamic information.

30. A wireless communications apparatus, comprising:
at least one processor configured to determine a subcarrier on which a beacon symbol is received, said at least one processor further configured to determine a group of subcarriers that is defined by a predetermined multi-group partition of available subcarriers and that contains the determined subcarrier, wherein the subcarriers of each group of the multi-group partition are respectively associated with subcarrier indices, and the at least one processor further configured to identify, over the determined group, a subcarrier index associated with the determined subcarrier, and wherein the determined group and the identified subcarrier index respectively indicate first beacon information and second beacon information; and
a memory coupled to the at least one processor;
wherein the determined subcarrier on which the beacon symbol is received is indicative of both the identified subcarrier index and the determined group of subcarriers.

31. The wireless communications apparatus of claim 30, the at least one processor further configured to recover the first beacon information based at least in part on the determined group of subcarriers.

32. The wireless communications apparatus of claim 31, the at least one processor further configured to recover the second beacon information based at least in part on the identified subcarrier index.

33. The wireless communications apparatus of claim 30, wherein the first beacon information is dynamic information that can change each beacon symbol and the second beacon information is static information that is one beacon symbol in a multiple beacon symbol message, and wherein a quantity of groups in said multi-group partition is equal to a quantity of different instances of said dynamic information.

34. The wireless communications apparatus of claim 30, the at least one processor further configured to decode the beacon symbol according to a maximum distance separable (MDS) code or a Reed-Solomon code.

35. A wireless communications apparatus for decoding multiple information types of a beacon symbol, comprising:
means for determining a subcarrier on which a beacon symbol is received;
means for determining, from among a plurality of groups defined by a predetermined multi-group partition of available subcarriers, a group of subcarriers that contains the determined subcarrier, wherein the subcarriers of each said group are respectively associated with subcarrier indices;
means for identifying, over the determined group, a subcarrier index associated with the determined subcarrier;
means for recovering, based on the identified subcarrier index, first beacon information indicated by the identified subcarrier index; and
means for recovering, based on the determined group of subcarriers, second beacon information indicated by the determined group of subcarriers;
wherein the determined subcarrier on which the beacon symbol is received is indicative of both the identified subcarrier index and the determined group of subcarriers.

36. The wireless communications apparatus of claim 35, wherein said means for determining the group of subcarriers includes means for taking (a) an actual subcarrier index, over the total number of available subcarriers and corresponding to the determined subcarrier, integer divided by (b) a same number of subcarriers commonly contained in each group in the plurality of groups.

37. The wireless communications apparatus of claim 35, wherein said means for identifying includes means for taking an actual subcarrier index, over the total number of available subcarriers and corresponding to the determined subcarrier, modulo a same number of subcarriers commonly contained in each group in the plurality of groups.

38. The wireless communications apparatus of claim 35, further comprising:
means for obtaining at least one non-binary symbol based on the identified subcarrier index; and
means for decoding the at least one non-binary symbol.

39. The wireless communications apparatus of claim 38, the at least one non-binary symbol is a portion of a beacon signal.

40. The wireless communications apparatus of claim 39, the beacon signal corresponds to a maximum distance separable (MDS) code or a Reed-Solomon coding scheme.

41. The wireless communications apparatus of claim 35, wherein the second beacon information is dynamic information, and wherein a quantity of said groups in said plurality of groups is equal to a quantity of different instances of said dynamic information.

42. A computer program product, comprising:
a non-transitory computer-readable medium comprising:
code for causing at least one computer to receive a beacon symbol;
code for causing the at least one computer to determine a subcarrier on which the beacon symbol is received;
code for causing the at least one computer to determine a group of subcarriers that contains the determined subcarrier, wherein the determined group is one of a plurality of groups defined by a predetermined multi-group partition of a total number of available subcarriers, and wherein the subcarriers of each said group are respectively associated with subcarrier indices; and code for causing the at least one computer to identify, over the determined group, a subcarrier index associated with the determined subcarrier, wherein the identified subcarrier index and the determined group respectively indicate first beacon information and second beacon information, and wherein the determined subcarrier on which the beacon symbol is received is indicative of both the identified subcarrier index and the determined group of subcarriers.

43. A wireless communication apparatus, comprising:

a processor configured to:
- determine a subcarrier on which a beacon symbol is received;
- determine, from among a plurality of groups defined by a predetermined multi-group partition of available subcarriers, a group of subcarriers that contains the determined subcarrier, wherein the subcarriers of each said group are respectively associate with subcarrier indices;
- identify, over the determined group, a subcarrier index associated with the determined subcarrier;
- recover, based on the identified subcarrier index, first beacon information indicated by the identified subcarrier index; and
- recover, based on the determined group of subcarriers, second beacon information indicated by the determined group of subcarriers; and a memory coupled to the processor;

wherein the determined subcarrier on which the beacon symbol is received is indicative of both the identified subcarrier index and the determined group of subcarriers.

44. The wireless communication apparatus of claim 43, wherein the first beacon information is static information and the second beacon information is dynamic information, and wherein a quantity of said groups in said plurality of groups is equal to a quantity of different instances of said dynamic information.

* * * * *